US007024469B1

(12) United States Patent
Chang et al.

(10) Patent No.: US 7,024,469 B1
(45) Date of Patent: Apr. 4, 2006

(54) MEDIUM ACCESS CONTROL (MAC) PROTOCOL WITH SEAMLESS POLLING/CONTENTION MODES

(75) Inventors: Chih-Yuan Chang, Palo Alto, CA (US); Jenwei Liang, Cupertino, CA (US); Huei-ming Steve Yang, Redwood City, CA (US); Yee-Hsiang Chang, Cupertino, CA (US); Francis James Smith, Livermore, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 371 days.

(21) Appl. No.: 09/649,474

(22) Filed: Aug. 28, 2000

(51) Int. Cl.
G06F 15/177 (2006.01)
H04J 3/16 (2006.01)
H04L 12/40 (2006.01)
H04L 12/43 (2006.01)

(52) U.S. Cl. .................. 709/220; 370/346; 370/449; 370/461; 709/226

(58) Field of Classification Search ............ 370/310.2, 370/213, 433, 395.6, 310.1, 395.64, 392, 370/395.52, 347, 447, 431; 710/46; 711/218; 340/3.51; 709/220, 248
See application file for complete search history.

(56) References Cited

U.S. PATENT DOCUMENTS

| 4,071,908 | A | * | 1/1978 | Brophy et al. ............. 710/46 |
| 4,556,960 | A | * | 12/1985 | Cohn et al. ............... 711/218 |
| 4,667,193 | A | * | 5/1987 | Cotie et al. ............. 340/825.52 |
| 5,384,777 | A |   | 1/1995 | Ahmadi et al. ............ 370/85.2 |
| 5,499,243 | A |   | 3/1996 | Hall ......................... 370/85.8 |
| 5,615,212 | A | * | 3/1997 | Ruszczyk et al. .......... 370/433 |
| 5,677,909 | A | * | 10/1997 | Heide ........................ 370/347 |
| 5,787,080 | A | * | 7/1998 | Hulyalkar et al. ......... 370/310.2 |
| 5,892,769 | A | * | 4/1999 | Lee ........................... 370/447 |
| 5,970,062 | A |   | 10/1999 | Bauchot ...................... 370/345 |
| 5,982,742 | A | * | 11/1999 | Leung et al. .............. 370/213 |
| 6,114,968 | A | * | 9/2000 | Ramakrishnan et al. ... 340/3.51 |
| 6,181,687 | B1 | * | 1/2001 | Bisdikian .................... 370/347 |
| 6,198,728 | B1 | * | 3/2001 | Hulyalkar et al. ......... 370/310.1 |
| 6,243,382 | B1 | * | 6/2001 | O'Neill et al. .......... 370/395.52 |
| 6,275,497 | B1 | * | 8/2001 | Varma et al. ............... 370/431 |
| 6,353,617 | B1 |   | 3/2002 | Cadd et al. ................. 370/445 |
| 6,366,761 | B1 |   | 4/2002 | Montpetit ................... 455/12.1 |
| 6,381,228 | B1 |   | 4/2002 | Prieto, Jr. et al. ........... 370/323 |
| 6,434,154 | B1 | * | 8/2002 | Stacey et al. ........... 370/395.64 |
| 6,470,013 | B1 | * | 10/2002 | Barach et al. ............... 370/392 |
| 6,529,520 | B1 |   | 3/2003 | Lee et al. ................... 370/442 |

(Continued)

FOREIGN PATENT DOCUMENTS

EP 0 679 005 A1 10/1995
EP 0 856 979 A2 8/1998

OTHER PUBLICATIONS

Acampora et al, A New Adaptive MAC Layer Protocol for Broadband Packet Wireless Networks in Harsh Fading and Interference Environments, IEEE, vol. 8, No. 3, Jun. 2000, pp. 328-336.*

(Continued)

Primary Examiner—John Follansbee
Assistant Examiner—Kenny Lin
(74) Attorney, Agent, or Firm—Haverstock & Owens LLP

(57) ABSTRACT

A high speed wireless network for the access market where a polling mode, a contention mode, a seamless transition between the two modes and an efficient contention resolution algorithm are utilized to coordinate user transmission while utilizing a splitting tree algorithm to avoid collision of a number of users.

39 Claims, 2 Drawing Sheets

Contention Splitting Tree

U.S. PATENT DOCUMENTS

| | | | |
|---|---|---|---|
| 6,621,803 B1 | 9/2003 | Halton et al. | 370/329 |
| 6,621,821 B1* | 9/2003 | Song | 370/395.6 |
| 6,697,346 B1 | 2/2004 | Halton et al. | 370/335 |
| 6,747,959 B1* | 6/2004 | Ho | 370/282 |
| 6,754,225 B1* | 6/2004 | Lin et al. | 370/442 |
| 6,785,252 B1 | 8/2004 | Zimmerman et al. | 370/337 |

OTHER PUBLICATIONS

Sfikas et al, ATM Cell Transmission Over the IEEE 802.11 Wireless MAC Protocol, IEEE, 1996, p. 173-177.*

Prycker et al, B-ISDN and the OSI Protocol Reference Model, IEEE, Mar. 1993, pp. 10-18.*

The Magic WAND Deliverable 3D1, "Wireless ATM MAC Overall Description".

ACTS Project AC085 Wireless ATM Network Demonstrator, The Magic WAND, Deliverable 1D5 WAND System Specification.

ACTS Project AC085 Wireless ATM Network Demonstrator, The Magic WAND, Deliverable 3D4 Wireless ATM MAC Performace Results.

ACTS Project AC085 Wireless ATM Network Demonstrator, The Magic WAND, Deliverable 3D5 Wireless ATM MAC—Final Report.

The Magic WAND Deliverable 3D1, "Wireless ATM MAC Overall Description", no date.

ACTS Project AC085 Wireless ATM Network Demonstrator, The Magic WAND, Deliverable 1D5 WAND System Specification, no date.

ACTS Project AC085 Wireless ATM Network Demonstrator, The Magic WAND, Deliverable 3D4 Wireless ATM MAC Performace Results, no date.

ACTS Project AC085 Wireless ATM Network Demonstrator, The Magic WAND, Deliverable 3D5 Wireless ATM MAC—Final Report, no date.

* cited by examiner

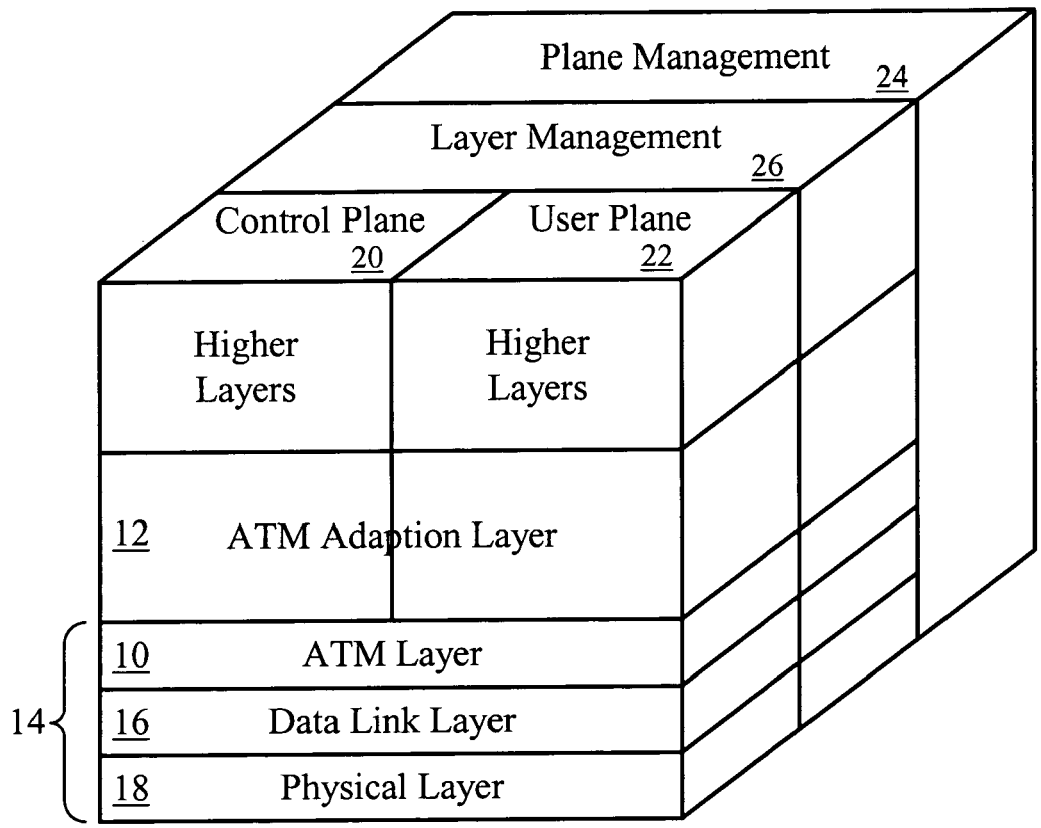
Fig. 1 -ATM Cube
| 0PPP_PPPP | Group of 2 (xPPP_PPPP) |
|---|---|
| 10PP_PPPP | Group of 4 (xxPP_PPPP) |
| 110P_PPPP | Group of 8 (xxxP_PPPP) |
| 1110_PPPP | Group of 16 (xxxx_PPPP) |
| 1111_0PPP | Group of 32 (xxxx_xPPP) |
| 1111_10PP | Group of 64 (xxxx_xxPP) |
| 1111_110P | Group of 128 (xxxx_xxxP) |
| 1111_1110 | Group of 256 (xxxx_xxxx) |
Fig. 2 -Multicast ID

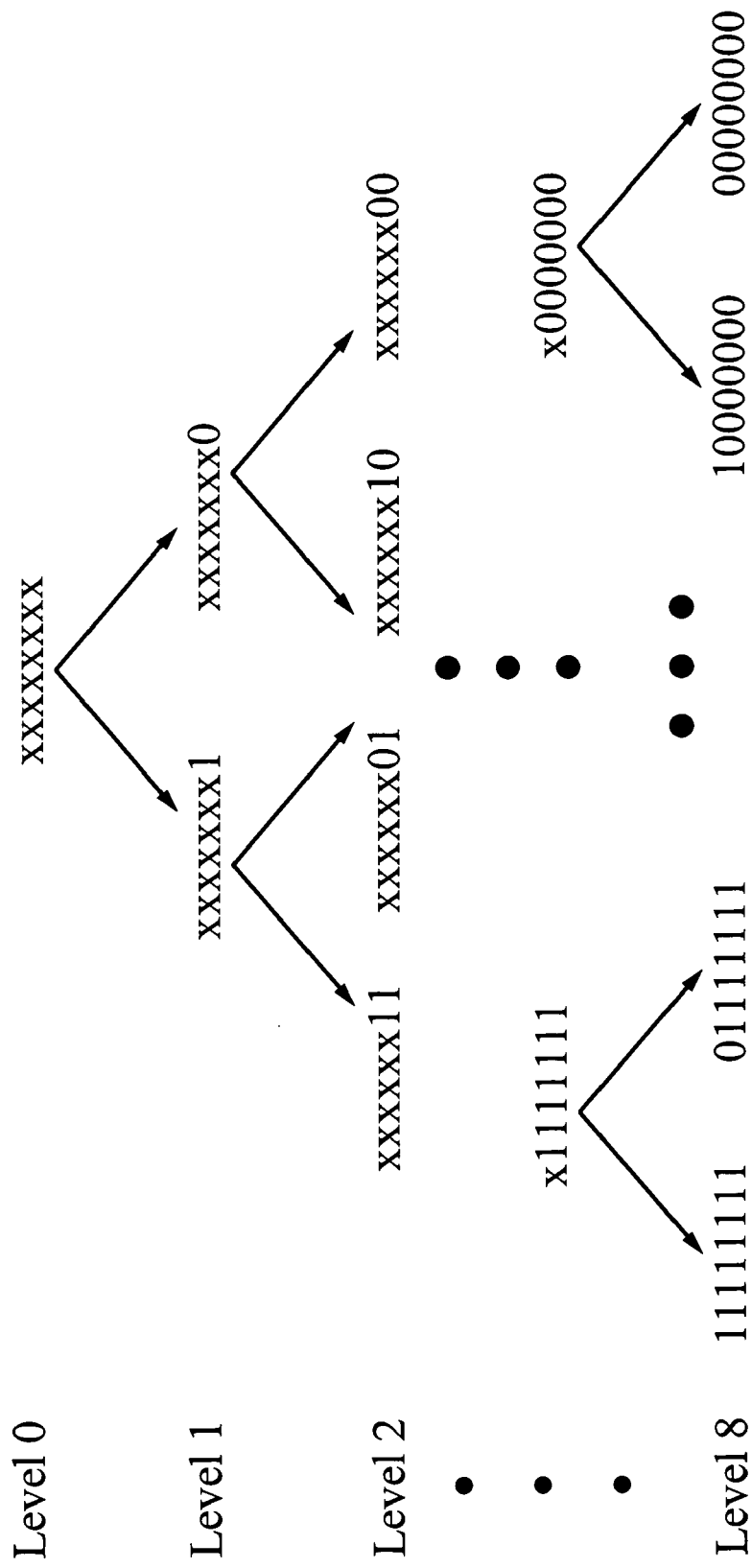
Fig. 3 - Contention Splitting Tree

MEDIUM ACCESS CONTROL (MAC) PROTOCOL WITH SEAMLESS POLLING/CONTENTION MODES

FIELD OF THE INVENTION

This invention relates to the field of high speed wireless networks. More particularly, this invention relates to the field of implementing a Medium Access Control (MAC) to coordinate transmission from End User Nodes (EUNs) to a transmission Hub to achieve high performance in an asynchronous transfer mode (ATM) cell.

BACKGROUND OF THE INVENTION

The general structure of a high speed wireless network utilizes a central Hub and a number of End User Nodes (EUNs). The basic operating unit of the system is a cell, where the Hub is located at the center of the cell and the EUNs are distributed within the coverage range of the Hub. In the downstream direction (from the Hub to the EUNs), the communication channel is a broadcasting channel. In other words, any signal sent by the Hub is received by every EUN in the system.

In the upstream direction (from the EUNs to the Hub), each EUN transmission is a unicast heard only by the Hub. In a conventional high speed wireless network, the EUNs are not configured to receive transmissions from other EUNs. The upstream communication channel is shared by many EUNs using one of two types of access systems. A first access system is known as a time division multiple access (TDMA) based system is one in which all the EUNs transmit using the same frequency, but avoid colliding by transmitting at different times. A second access system is called a frequency division multiple access (FDMA) system is one in which each EUN has a separate frequency assignment to avoid collision when coordinating transmission. In both these access systems, the downstream signal is transmitted at a different carrier frequency than the upstream signal. However, because the upstream and downstream slots are of the same length, both channels have the same bandwidth.

As the EUNs are switched on, the Hub executes a one time ranging operation. Ranging determines the distance between each EUN and the Hub. An EUN which is far from the Hub must transmit faster than an EUN which is near to the Hub. After the ranging is complete, the EUNs are accordingly aligned by the Hub in time slots from the frame of reference of the Hub.

During any given time slot, only one EUN is allowed to transmit at a time. To coordinate EUN transmission in a given time slot, the Hub may utilize one of two main coordinating modes.

A contention mode is utilized to coordinate transmission when there is a relatively small number of EUNs in the system trying to capture the upstream bandwidth. When there is a larger number of EUNs in the system, a request and grant, or piggybacking mode is used.

In the contention mode, the Hub broadcasts which EUNs are eligible to contend for a particular time slot. Each contending EUN will then answer the broadcast if that particular EUN wishes to transmit. This mode is particularly useful when there is a relatively small amount of EUNs in the system, or when idle EUNs require a route to request grants quickly.

The request and grant, or piggybacking mode functions oppositely of the contention mode. In the piggybacking mode, each individual EUN that wishes to transmit will unicast a request for a time slot from the Hub. The Hub will then broadcast a time slot grant signal to every EUN. When this occurs, each individual EUN will receive the signal and will recognize whether it, or another EUN is receiving a time slot grant. These grants will assign EUNs to time slots based on bandwidth availability. This mode is most effective when there are a large number of EUNs transmitting continuously.

In the case of a TDMA system, because all of the upstream EUN transmissions are sharing a frequency bandwidth, a MAC is needed to coordinate or assign time slots so that transmission in the upstream direction is not garbled. In other words, a MAC is needed to ensure that two EUNs are not transmitting at the same time.

SUMMARY OF THE INVENTION

The present invention is a method of coordinating slotted multiple access in a wireless network channel shared by a plurality of users. The present invention utilizes a polling mode, a contention mode and a seamless transition between the polling and contention modes to coordinate user transmission.

The present invention performs these operations by assigning each of the plurality of users an address from a pool which contains $2^k$ addresses. The address pool is then split into $2^x$ subgroups and only users belonging to a specific subgroup at any transmission opportunity are allowed to transmit.

Next, a multiple access cycle is started where x could be any number from 0 to k. The contention mode occurs when X=0 and only one subgroup exists and the polling mode occurs when X=K and there are $2^k$ subgroups containing only one user. The seamless transition between the two modes occurs by changing the X parameter.

When a collision occurs between two users, the subgroup X will be split into two subgroups (X=X+1), both subgroups containing half the number of users in the parent groups. The subgroup will continue to split after additional collisions until no collisions occurs, at which time the multiple access cycle ends and a new cycle begins.

BRIEF DESCRIPTION OF THE DRAWINGS

FIG. 1 illustrates an ATM cube in a stack configuration of the present invention.

FIG. 2 illustrates a Multicast ID Table of the present invention.

FIG. 3 illustrates the preferred Contention Splitting Tree method of the present invention.

DETAILED DESCRIPTION OF THE PREFERRED EMBODIMENT

In the preferred embodiment of the present method, the basis for transmission of broadband information in this type of high speed wireless network is asynchronous transfer mode (ATM). An ATM Cube may be considered in terms of a traditional stack configuration as depicted in FIG. 1. More specifically, the Hub receives ATM cells from a back-haul network and delivers them in a special format to the EUNs.

In the reverse direction, an EUN receives ATM cells from its subscribers or converts legacy interfaces to ATM and delivers these ATM cells in a special format to the Hub. The Hub recovers the ATM cells from the upstream signals and delivers them to the back-haul network.

Any ATM system may be considered in terms of the traditional layered protocol stack (FIG. 1). In this framework, the ATM Layer (10) is responsible for delivery of data across multiple physical connections. The ATM Adaption Layers (AALs) (12) and applications operate above the ATM Layer (10). Below the Network Layer, the ATM specification refers to a Physical Layer (PHY) (18). An ATM's PHY (18) consists of the Transmission Convergence (TC) Sub-Layer (14) and the Physical Medium (PM). In terms of the traditional stack model, the TC is the Data Link Layer (DLL) (16) and the PHY (18) combined. In the traditional stack model, the DLL (16) is typically broken down into two sub-layers, a Logical Link Control (LLC), which interfaces to the network, and a MAC which interfaces to the PHY (18).

Referring again to FIG. 1, an ATM system is also divided into vertical planes, which provide similar services in all protocol layers. These planes are the control, user, and management planes. The User Plane (22) is responsible for carrying data, including control and management information, across those connections and for performing functions such as flow control. The Control Plane (20) is responsible for performing call control and connection control functions. The Management Plane (24) is responsible for resource allocation, error and fault reporting, operation and maintenance (OAM) information flows, and any parameters associated with a given layer. In addition, an overall Layer Management (26) spans all layers and is responsible for the coordination of the entire system.

The preferred embodiment of the present method starts by assigning each user a distinct address from an address pool consisting of $2^k$ addresses, where $2^k$ is the maximal number of users within one channel. The address pool can be dynamically split into $2^x$ subgroups, X=0, 1, ..., K. At any transmission opportunity, a centralized controller allows only the users belonging to a specific subgroup to transmit. When a multiple access cycle starts, X could be any number ranging from 0 to K depending on the current system loading. When X=0, there is one subgroup and every user is allowed to transmit. This is the contention mode.

When X=K, there are $2^k$ subgroups, and each subgroup contains only one user. By definition, this becomes a polling mode. When X is between 0 and K, each subgroup with active users is polled one at a time, and contention could occur within each subgroup. This embodiment can seemlessly shift from the polling mode to the contention mode by changing the parameter X. When a collision occurs within a subgroup, the subgroup will be further split into two sub-groups (X=X+1) where each one contains half the number of users in the parent subgroup. If no more collisions happen in any subgroup, the multiple access cycle ends and a new cycle begins. If any collisions happen, the subgroup will split again. Eventually, when X=K and each subgroup contains only one user, contention is guaranteed to be resolved.

The preferred embodiment of the present method assigns each physical EUN a unique 6-byte physical identification that is used during sign-on. Thereafter, it is assigned a logical EUN_ID from 1 to 254 (i.e. 0000_0001 to 1111_1110). The EUN_ID is changeable on the fly and a physical EUN may be assigned multiple EUN_IDs in order to allow it to have more than 256 Virtual Circuits (VCs). The link address is a 16 bit number, broken down into an 8 bit EUN_ID, with an 8 bit sub-address. These bits can be used to specify a null, unicast or multicast/broadcast addresses.

According to the preferred embodiment of the present invention as depicted in FIG. 2, multicast addressing is used for sending control messages and to assign contention slots. The multicast addresses use an EUN_ID of 255 (1111_1111). This form of addressing uses the 8 bit sub-addresses to specify a group of EUNs. As shown in FIG. 2, a group may consist of all EUNs down to a specific EUN.

The upstream air interface of the preferred embodiment uses TDMA. Individual upstream slots are assigned to a specific VC in a specific EUN. Contention timeslots are assigned to a group of EUNs, using the multicast addressing mode. Since there is no retry mechanism, only cell requests may be transmitted in contention slots.

Two requests are included in each upstream burst in the MAC messaging field. Each request includes of an 8 bit link layer connection (VCI) address (i.e. a link address without the EUN_ID, which would be the same as that in the Link Address field), and an 8 bit length field, indicating the number of cells which are currently queued at the EUN. Because the actual length is transmitted, the effects of a lost or duplicated request are minimized.

The preferred embodiment of the invention also provides a contention mechanism to allow the EUN to notify the Hub of pending traffic. It is anticipated that the majority of the requests will be carried in normal MAC cells (piggybacking), but the contention mechanism provides a route for idle EUNs to request grants quickly. An upstream contention slot will be announced to all EUNs via a grant from the Hub using the multicast addressing mode, which indicates the group of EUNs that may contend.

The preferred embodiment of the present invention is depicted in FIG. 3 and is configured to resolve any collisions in a contention slot. A splitting tree algorithm is used in the collision avoidance. As an example, the Hub may start the contention process at the root of the splitting tree (level 0) by sending a multicasting grant downstream. The multicasting grant allows all EUNs to send requests in the indicated contention slot. If a collision occurs in the allocated time slot, the Hub shall split the original group into two groups (level 1). Any convenient division may be used, for example one group could be for odd-numbered EUNs and another group for even-numbered EUNs. If a contention is detected in the odd-numbered group, the Hub will then divide the tree into one-half again, for example for the odd-numbered group, one half the group could have all numbers with an odd in the least significant bit and the odd in the next least significant bit. The Hub then assigns a future contention slot to each group. The splitting process ends when no collision is detected, or only two EUNs remain in the group. If two EUNs contend, they are polled individually. Once a single EUN is determined, an "end of contention cycle" signal is then transmitted.

The Hub is configured to detect an amount of received power. The amount of received power is indicative, but not determinative of the number EUNs involved in a collision. Depending upon the number of colliding EUNs, the Hub can selectively choose to begin splitting the tree at any level. Under certain circumstances this can reduce the amount of time necessary to identify a particular contending EUN.

Summarily, the preferred embodiment of the present invention follows a protocol in which an EUN may chooses to send or not to send requests in contention time slots addressed to that EUN. An EUN must not send any cell in contention time slots where the EUN is not addressed. The Hub may start the splitting tree contention process at any level. The Hub must split a grant into two whenever there is a collision in the corresponding allocated contention time slot. Lastly, the Hub must stop splitting a grant whenever there is no collision in the corresponding allocated contention time slot.

Since this is under the control of the Hub, the effects of a lost message are significantly reduced. This algorithm also has the significant advantage that all contentions are guaranteed to be resolved within a fixed amount of time. Other algorithms rely on random numbers, which may produce arbitrarily long delays. These effects produce a much more robust solution to the contention problem. Furthermore, by breaking the EUNs down into groups, each group that contends may be resolved in parallel, leading to faster contention resolution.

Other aspects of the preferred embodiment of the present invention include the MAC continuously selecting cells to transmit in the downstream direction and assign upstream slots to specific VCs at specific EUNs. The downstream direction is straightforward, being very similar to existing wireline ATM systems. A Weighted Fair Queue (WFQ) is used for data traffic while the Constant Bit Rate (CBR) traffic is transmitted immediately on a First In First Out (FIFO) basis.

Allocating the upstream bandwidth in the preferred embodiment is significantly more complicated. Each EUN sends requests to the Hub for specific VCs, which are carried with other upstream cells or vial the contention mechanism. The Hub takes these requests and converts them into pseudo cells, which are input to an ATM scheduler. The Hub also predicts the arrival of CBR traffic, and generates pseudo cells for them automatically. To make each assignment, the Hub examines the virtual cell selected by the scheduler and grants an assignment to the corresponding VC at the appropriate EUN. Normally, requests are carried with other traffic in the request fields of upstream MAC cells. However, a contention mechanism is provided to significantly reduce latency when an otherwise idle EUN receives cells to transmit upstream.

The sign-on procedure of the preferred embodiment is used by an EUN to establish initial ranging and power adjustments and establish a MAC level connection with the Hub and is a variation of the standard ranging process as described in [Survey of Ranging and Calibration Algorithms, KA]. Following sign-on, the DLL performs authentication of the newly connected EUN and VCs. A standard sign-off procedure is provided to allow the Hub or a local operator to gracefully terminate an EUN's connection. A mechanism for detecting connection loss due to extreme RF conditions and algorithms to automatically reestablish the connection are provided.

It will be readily apparent to one skilled in the art that other various modifications may be made to the preferred embodiment without departing from the spirit and scope of the invention as defined by the appended claims.

What is claimed is:

1. A method of coordinating slotted multiple access in a wireless network channel shared by a plurality of users comprising the steps of:
   a. assigning each of a plurality of users into a subgroup, thereby forming one or more subgroups of users, wherein each subgroup utilizes a contention mode;
   b. utilizing a polling mode to provide each subgroup a transmission opportunity; and
   c. utilizing a seamless transition between the polling and contention modes such that when a specific subgroup is provided a transmission opportunity and a collision occurs between user signals within the specific subgroup, the specific subgroup is split into smaller subgroups, each smaller subgroup including a portion of the users within the specific subgroup and each smaller subgroup utilizes a contention mode.

2. The method of claim 1 further comprising assigning each of the plurality of users a distinct address from an address pool.

3. The method of claim 2 wherein the address pool contains $2^k$ addresses, the maximum number of users within one channel.

4. The method of claim 2 further comprising dynamically splitting the address pool into $2^x$ subgroups.

5. The method of claim 4 further comprising transmitting only the users belonging to the specific subgroup at any transmission opportunity.

6. The method of claim 5 further comprising starting of a multiple access cycle where x could be any number from 0 to k.

7. The method of claim 6 wherein the contention mode occurs for each of the plurality of users when x=0 and only one subgroup exists allowing every user to transmit.

8. The method of claim 6 wherein the polling mode occurs for each of the plurality of users when x=k and there are $2^k$ subgroups containing only one user.

9. The method of claim 6 wherein the seamless transition between the polling mode and the contention mode occurs by changing the x parameter.

10. Method of claim 1 further comprising applying a contention resolution algorithm when a collision between two user signals occurs.

11. The method of claim 10 wherein when the collision occurs between two user signals, a subgroup x will be split into two smaller subgroups (x=x+1), both smaller subgroups containing half the number of users in the subgroup x.

12. The method of claim 11 wherein when another collision between two user signals occurs within one of the smaller subgroups, the one smaller subgroup will again split.

13. The method of claim 10 wherein when collisions no longer occur in any subgroup, a multiple access cycle ends and a new cycle begins.

14. An apparatus for coordinating slotted multiple access in a wireless network channel shared by a plurality of users comprising:
   a. means for assigning each one of a plurality of users into a subgroup, thereby forming one or more subgroups of users;
   b. means for implementing a polling mode to provide each subgroup a transmission opportunity;
   c. means for implementing a contention mode within each subgroup; and
   d. means for providing a seamless transition between the polling and contention modes such that when a specific subgroup is provided a transmission opportunity and a collision occurs between user signals within the specific subgroup, the specific subgroup is split into smaller subgroups, each smaller subgroup including a portion of the users within the specific subgroup and each smaller subgroup utilizes a contention mode.

15. The apparatus of claim 14 further including means for assigning each of the plurality of users a distinct address from an address pool.

16. The apparatus of claim 15 wherein the address pool contains $2^k$ addresses, the maximum number of users within one channel.

17. The apparatus of claim 15 further including means for dynamically splitting the address pool into $2^x$ subgroups.

18. The apparatus of claim 17 further including means for transmitting only the users belonging to the specific subgroup at any transmission opportunity.

19. The apparatus of claim 18 further including means for starting of a multiple access cycle where x could be any number from 0 to k.

20. The apparatus of claim 19 wherein the contention mode occurs for each of the plurality of users when x=0 and only one subgroup exists allowing every user to transmit.

21. The apparatus of claim 19 wherein the polling mode occurs for each of the plurality of users when x=k and there are $2^k$ subgroups containing only one user.

22. The apparatus of claim 19 wherein the seamless transition between the polling mode and the contention mode occurs by changing the x parameter.

23. The apparatus of claim 14 further comprising applying a contention resolution algorithm when a collision between two user signals occurs.

24. The apparatus of claim 23 wherein when the collision occurs between two user signals, a subgroup x will be split into two smaller subgroups (x=x+1), both smaller subgroups containing half the number of users in the subgroup x.

25. The apparatus of claim 24 wherein when another collision between two user signals occurs within one of the smaller subgroups, the one smaller subgroup will again split.

26. The apparatus of claim 23 wherein when collisions no longer occur in any subgroup, a multiple access cycle ends and a new cycle begins.

27. An apparatus for coordinating slotted multiple access in a wireless network channel shared by a plurality of users comprising:
   a. an ATM cube for operating a high speed wireless network consisting of a plurality of horizontal and vertical management layers;
   b. a hub for transmitting and receiving wireless network signals such that the hub may receive requests and assign portions of a communication bandwidth; and
   c. a plurality of end user nodes for transmitting and receiving wireless network signals such that a plurality of users may request or be granted a portion of the communication bandwidth,
   wherein the hub assigns each one of the plurality of users into a subgroup that utilizes a contention mode, and when a specific subgroup is provided a transmission opportunity according to a polling mode and a collision occurs between user signals within the specific subgroup, the hub splits the specific subgroup into smaller subgroups, each smaller subgroup including a portion of the users within the specific subgroup and each smaller subgroup utilizes a contention mode.

28. Apparatus of claim 27 wherein the hub assigns each of the plurality of users a distinct address from an address pool.

29. The apparatus of claim 28 wherein the address pool contains $2^k$ addresses, the maximum number of users within one channel.

30. The apparatus of claim 28 wherein the address pool may be dynamically split into $2^x$ subgroups.

31. The apparatus of claim 30 wherein at any transmission opportunity only the users belonging to the specific subgroup transmit.

32. The apparatus of claim 31 wherein the hub starts a multiple access cycle where x could be any number from 0 to k.

33. The apparatus of claim 32 wherein the contention mode occurs for each of the plurality of users when x=0 and only one subgroup exists allowing every user to transmit.

34. The apparatus of claim 32 wherein the polling mode occurs for each of the plurality of users when x=k and there are $2^k$ subgroups containing only one user.

35. The apparatus of claim 32 wherein a seamless transition between the polling mode and the contention mode occurs by changing the x parameter.

36. The apparatus of claim 27 wherein the hub implements a contention resolution algorithm when a collision between two user signals occurs.

37. The apparatus of claim 36 wherein when the collision occurs between two user signals, a subgroup x will be split into two smaller subgroups (x=x+1), both smaller subgroups containing half the number of users in the subgroup x.

38. The apparatus of claim 37 wherein when another collision between two user signals occurs within one of the smaller subgroups, the one smaller subgroup will again split.

39. The apparatus of claim 36 wherein when collisions no longer occur in any subgroup, a multiple access cycle ends and a new cycle begins.

* * * * *